United States Patent

Aybay et al.

[11] Patent Number: 6,044,061
[45] Date of Patent: Mar. 28, 2000

[54] METHOD AND APPARATUS FOR FAIR AND EFFICIENT SCHEDULING OF VARIABLE-SIZE DATA PACKETS IN AN INPUT-BUFFERED MULTIPOINT SWITCH

[75] Inventors: Günes Aybay; Philip Arnold Ferolito, both of Sunnyvale, Calif.

[73] Assignee: Cabletron Systems, Inc., Rochester, N.H.

[21] Appl. No.: 09/037,218

[22] Filed: Mar. 10, 1998

[51] Int. Cl.[7] .................................................. H04L 12/56
[52] U.S. Cl. .......................... 370/230; 370/398; 370/416; 370/429; 710/39; 710/40
[58] Field of Search ..................................... 370/230, 231, 370/389, 395, 398, 412, 415, 416, 422, 428, 429; 710/36, 39, 40, 49, 50

[56] References Cited

U.S. PATENT DOCUMENTS

| | | | |
|---|---|---|---|
| 5,140,582 | 8/1992 | Tsuboi et al. | 370/416 |
| 5,241,536 | 8/1993 | Grimble et al. | 370/398 |
| 5,255,265 | 10/1993 | Eng et al. | 370/60 |
| 5,301,333 | 4/1994 | Lee | 370/416 |
| 5,471,590 | 11/1995 | Melo et al. | 395/288 |
| 5,500,858 | 3/1996 | McKeown | 370/60 |
| 5,517,495 | 5/1996 | Lund et al. | 370/60 |
| 5,561,669 | 10/1996 | Lenney et al. | 370/60.1 |
| 5,631,908 | 5/1997 | Saxe | 370/235 |
| 5,689,508 | 11/1997 | Lyles | 370/391 |
| 5,742,597 | 4/1998 | Holt et al. | 370/390 |

*Primary Examiner*—Alpus H. Hsu
*Attorney, Agent, or Firm*—Law Offices of Mark A. Wilson; Mark A. Wilson

[57] ABSTRACT

An input-buffered multipoint switch having input channels and output channels includes multi-level request buffers, a data path multiplexer, and a scheduler. The switch has a distinct multi-level request buffer associated with each input channel and each request buffer has multiple request registers for storing data cell transfer requests of different priorities. The multi-level request registers are linked in parallel to the scheduler to allow arbitration among requests of different input channels and different priority levels. The preferred arbitration process involves generating masks that reflect the output channels required by the same priority level requests. Utilizing masks to arbitrate between multiple requests in an input-buffered switch reduces arbitration cycle time and minimizes HOL blocking.

20 Claims, 13 Drawing Sheets

|      | RQ_CH0 | RQ_CH1 | RQ_CH2 | RQ_CH3 |
|------|--------|--------|--------|--------|
| L3   | 1 1 0 0 | 0 0 0 1 | 1 1 1 1 | 0 0 0 1 |
| L2   | 1 0 0 0 | 0 0 1 0 | 0 0 0 0 | 1 1 1 0 |
| L1   | 0 0 0 1 | 0 0 1 0 | 0 0 1 0 | 1 0 0 0 |
| L0   | 1 0 0 0 | 0 0 0 0 | 0 0 0 0 | 0 0 0 1 |

FIG. 9

RQ_CH0_L0      1 0 0 0
RQ_CH1_L0      0 0 0 0
RQ_CH2_L0      0 0 0 0
RQ_CH3_L0      0 0 0 1
L1_MASK        1 0 0 1

FIG. 10A

RQ_CH0_L1         0 0 0 1
RQ_CH1_L1         0 0 1 0
RQ_CH2_L1         0 0 1 0
RQ_CH3_L1         1 0 0 0
L1 AGGREGATE      1 0 1 1
L1_MASK           1 0 0 1
L2_MASK           1 0 1 1

FIG. 10B

RQ_CH0_L2         1 0 0 0
RQ_CH1_L2         0 0 1 0
RQ_CH2_L2         0 0 0 0
RQ_CH3_L2         1 1 1 0
L2 AGGREGATE      1 1 1 0
L2_MASK           1 0 1 1
L3_MASK           1 1 1 1

FIG. 10C

```
                IVEC  0 1 0 0
           RQ_CH1_L1  0 0 1 0
RESULTING RQ_CH1_L1   0 0 0 0

L1_MASK  1 0 0 1

NEW RQ_CH1_L1  0 0 0 0
```

FIG. 11A

```
                IVEC  0 1 0 0
           RQ_CH2_L1  0 0 1 0
RESULTING RQ_CH2_L1   0 0 1 0

L1_MASK  1 0 0 1

NEW RQ_CH2_L1  0 0 1 0
```

FIG. 11B

```
            IVEC           0 1 0 0
            OVEC           0 0 0 1
    NEW RQ_CH2_L1          0 0 1 0

GRANT_CH2_L1           0 0 1 0
    IVEC_NEXT_L1           0 1 1 0
    OVEC_NEXT_L1           0 0 1 1
```

FIG. 12

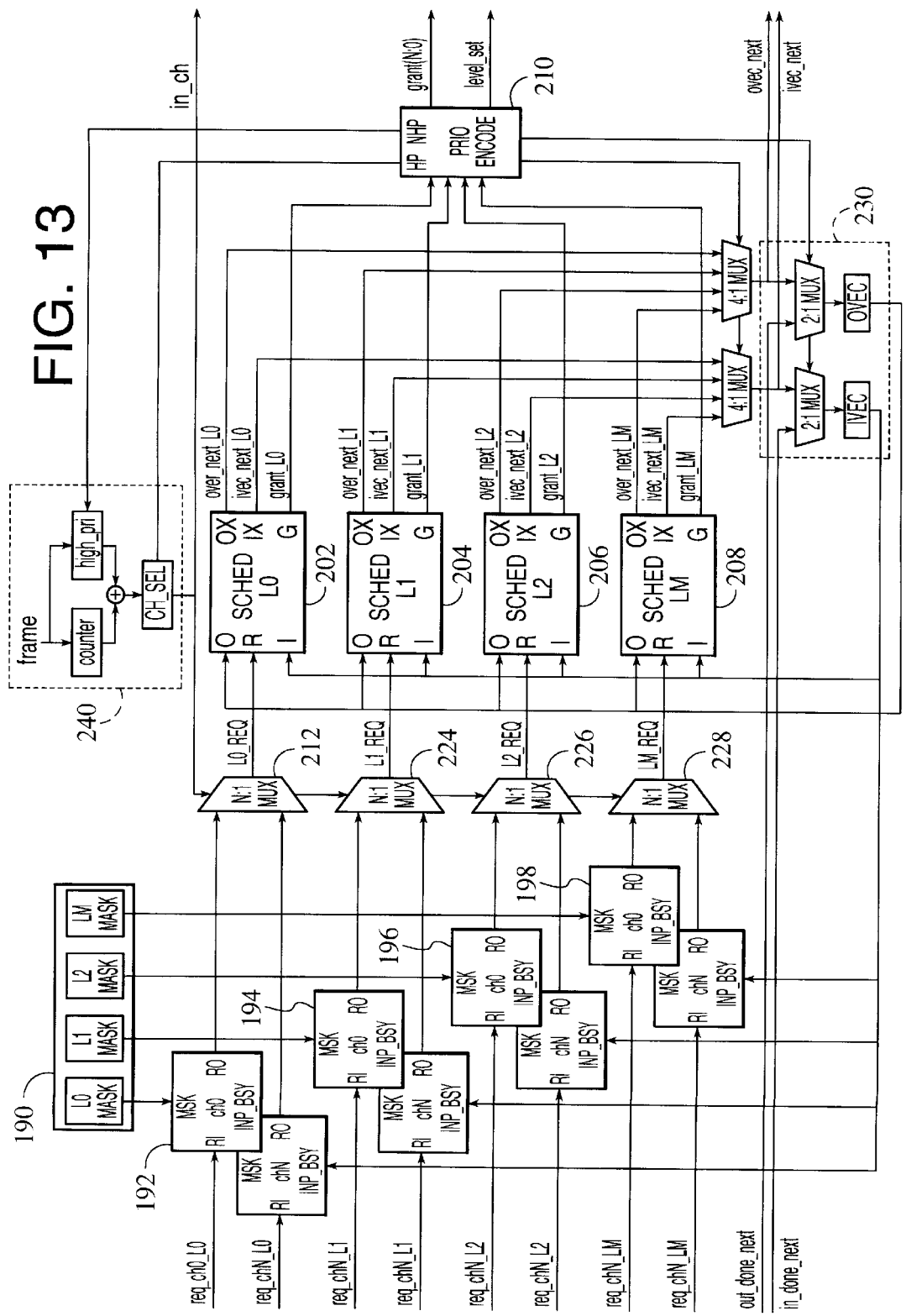

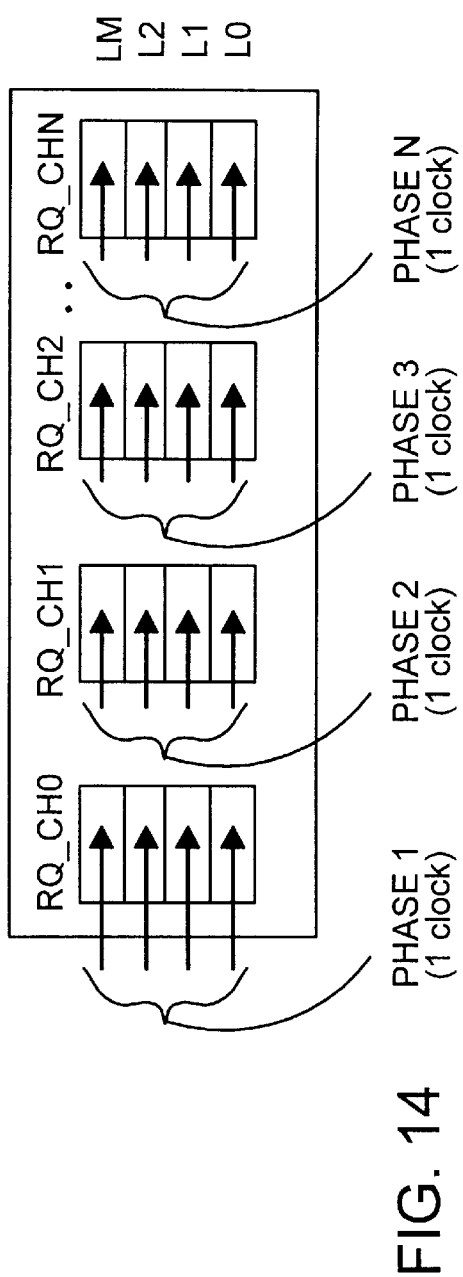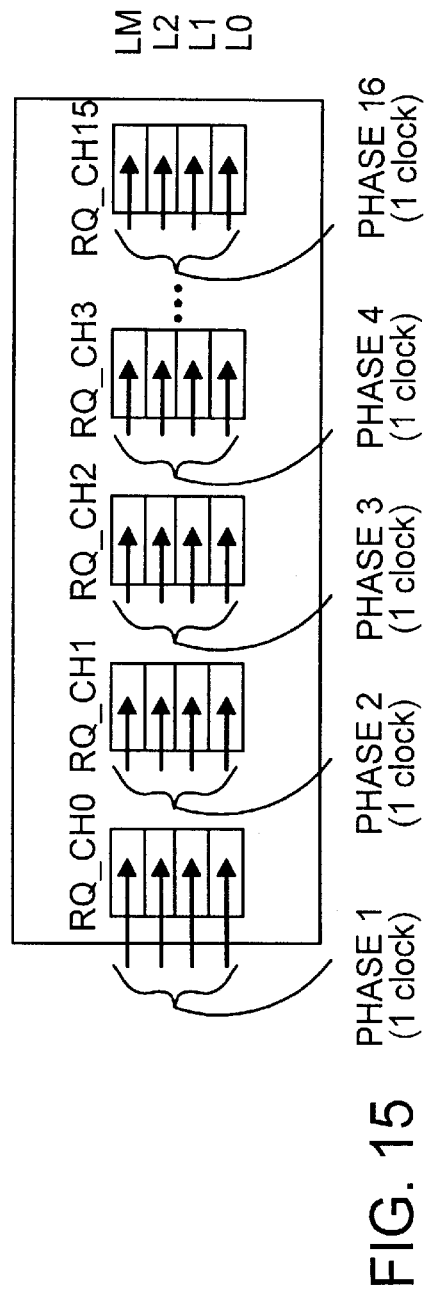

METHOD AND APPARATUS FOR FAIR AND EFFICIENT SCHEDULING OF VARIABLE-SIZE DATA PACKETS IN AN INPUT-BUFFERED MULTIPOINT SWITCH

TECHNICAL FIELD

The invention relates generally to the scheduling of packets in a high-bandwidth input-buffered multipoint switch, for instance as used in gigabit ethernet networks. More particularly, the invention describes a non-blocking scheduler that utilizes a parallel multi-level arbitration method.

BACKGROUND OF THE INVENTION

Networks are widely used to transfer voice, video, and data between various network devices such as telephones, televisions, and computers. Data transmitted through a network is typically segmented into packets and under some network protocols data is segmented into fixed-length cells. For example, Asynchronous Transfer Mode (ATM) protocol requires 53-byte cells, with 5 bytes of each cell designated for a header and 48 bytes of each cell designated for payload. Other network protocols, such as ethernet or Internet protocol, carry data in variable-size packets.

Switches are integral parts of most networks. Switches receive packets from input channels and direct packets to the appropriate output channels of the switch. Typical switches have three components: a physical switch fabric to provide the connections from input channels to output channels, a scheduling mechanism to direct traffic when multiple packets arrive on different input channels destined for the same output channel, and a buffering or queuing mechanism at the switch input or output to accommodate traffic fluctuations without undue packet loss. FIG. 1 is a diagram of a prior art switch 10 that has four input channels 12, 14, 16 and 18 and four output channels 20, 22, 24 and 26. The switch has serial input queues 28, 30, 32 and 36 for each input channel, a crossbar physical switch 38, and a crossbar scheduler 40. The crossbar scheduler receives a signal, referred to as a request, from an input queue. The request dictates the output channel or channels that will receive the queued packet. The scheduler arbitrates between competing requests and sends a signal, referred to as a grant, back to the input buffers that have been selected to deliver a packet.

In switches such as the switch 10 described in reference to FIG. 1, each input queue 28–36 provides requests to the scheduler 40 one at a time on a first-in-first-out (FIFO) basis and the scheduler arbitrates among the four requests received from the four input queues, with a goal of maximizing utilization of the input channels 12–18 and output channels 20–26 of the switch. As a grant is issued to a particular input channel to access a target output channel or channels, a new request is accessible by the scheduler in place of the granted request.

A problem known as head-of-line (HOL) blocking is created when one of the requests at the head of a queue line is a request for an output channel that is not available. HOL blocking is common when a multicast request is made because there is a lower probability that all of the output channels for the multicast request will be available immediately. When a request from a particular input channel is forced to wait until all output channels are available, all of the packets associated with the particular input channel are also forced to wait, thereby slowing the transfer of data from that input channel.

As one remedy to solving HOL blocking problems, parallel input queues have been implemented. Parallel input queues provide a separate FIFO queue for each output channel of the switch, with each queue providing a corresponding request to the scheduler. Referring to FIG. 2, an N input channel by N output channel switch requires N input queues 46 for each input channel for a total of $N^2$ input queues. With an $N^2$ scaling factor, the number of input queues connected to the crossbar scheduler 50 may be very high. For example, in a 16×16 switch, 256 separate queues are required. In spite of the added complexity, the advantage that the parallel design provides is that, with respect to any one of the input channels, a series of requests for available output channels is not held up by a single request for in-use output channels.

A variety of arbitration techniques can be used with parallel input channels to provide an efficient throughput through a switch. For example, maximum matching algorithms are designed in an attempt to assign output channels to input channels in such a way that a maximum number of transfers occur simultaneously. However, under heavy load conditions, maximum matching algorithms can prevent some requests from being granted, creating a new blocking problem. For example, referring to FIG. 3, input channel 1 is represented as requesting to transfer cells from its output-distributed queue 54 to output channel 1 only, while input channel 2 is requesting to transfer cells from its output-distributed queue 56 to output channels 1 and 2. Under a maximum matching approach, input channel 1 transmits cells to output channel 1 and input channel 2 transmits cells to output channel 2. However, input channel 2 will be blocked from transferring cells destined for output channel 1, since this would require the cell transfer from input channel 1 to output channel 1 to stop, and as a result, only output channel 1 would be utilized. As shown in FIG. 4, sending cells from input channel 2 to output channel 1 causes input channel 1 and output channel 2 to remain idle and does not achieve maximum matching.

Arbitration methods developed to optimize performance of high speed switches utilizing parallel input queues are disclosed in U.S. Pat. No. 5,500,858, entitled "Method and Apparatus for Switching Cells in an Input-Queued Switch," issued to McKeown and in U.S. Pat. No. 5,517,495, entitled "Fair Prioritized Scheduling in an Input-Buffered Switch," issued to Lund et al. Although these arbitration approaches are effective for their intended purpose, they both require that an N×N switch have $N^2$ distinct FIFO input queues. Since there are $N^2$ distinct FIFO input queues, there will also be $N^2$ requests delivered to the scheduler. As the number of input and output channels increases, the complexity of providing $N^2$ input queues and sending $N^2$ requests to the scheduler becomes costly and difficult to implement.

In addition to the problem of added complexity, the output-distributed queue architecture does not easily support multicast requests, which are more common in network protocols such as ethernet than in network protocols such as ATM. For example, in order to utilize the output-distributed architecture of FIG. 2 to satisfy a multicast request, the cell that is to be multicasted must either be replicated into all of the output channel queues that are indicated by the request or a separate multicast queue must be established in addition to the $N^2$ queues already present.

As a result of the shortcomings of conventional output-distributed queue architecture, what is needed is a method and apparatus that limit the number of input queues and the complexity of sending requests to a scheduler, while still maintaining fair and efficient scheduling.

SUMMARY OF THE INVENTION

A method and apparatus for scheduling data packets in a multipoint switch utilize request buffers having multi-level request registers that are linked in parallel to a scheduler to allow arbitration among requests of different input channels and different priority levels. Arbitration among the totality of requests can be executed on a priority basis such that grants are issued in response to requests in a sequence from the lowest priority request to the highest priority request. Alternatively, arbitration among different priority requests from the same input channel can be performed simultaneously in parallel on a channel-by-channel basis.

The preferred multipoint switch has N input channels and N output channels (e.g., N=16), with each input channel having a request buffer with M request registers (e.g., M=4) of different priorities for storing up to M requests with packet priority levels that correspond to the priorities of the request registers. The N request buffers are connected to a data path multiplexer and a scheduler. The N×M request registers of the N request buffers are connected in parallel to the scheduler, such that the scheduler can simultaneously access all N×M requests.

The scheduler of the preferred embodiment switches variable-size data packets by utilizing the requests from the request buffers to manage data traffic through the data path multiplexer in a manner that is designed to maximize the throughput of data without unfairly delaying lower priority data. To accomplish fair and efficient scheduling of variable-size data packets, the scheduler includes a mask generator unit, a mask compare unit, a level-specific scheduling unit, a priority encoder unit, and a resource management unit. The mask generator unit is a circuit that generates priority level-specific masks that are utilized in the arbitration process to indicate which output channels will be utilized by the input channels for a specific packet priority level. In the preferred 16×16 switch, a level-specific mask consists of a 16-bit vector where each bit represents one of the output channels. A level-specific mask is generated by combining all of the request vectors from the request channels 0 through 15 for the same packet priority level to form a single mask vector that represents all of the requests.

The mask compare unit is a circuit that compares level-specific masks generated by the mask generator to the availability of the input channels and to the requests from the corresponding packet priority level. The mask compare unit looks for conflicts between available inputs, requested outputs, and the corresponding mask.

The level-specific scheduling unit is a circuit that contains a level-specific sub-scheduler for each packet priority level. In the 16×16 switch, there are four level-specific sub-schedulers corresponding to the four packet priority levels. The level-specific sub-schedulers receive level-specific requests that are output from the mask compare unit and compare the input and output vectors, the requesting channel, and the requests to determine if channel conflicts exist. If no channel conflict exists between the input vector, the output vector, the requesting channel, and the request vector, a grant is issued and the input and output vectors are set to reflect a new grant.

The level-specific sub-scheduling units utilize a round-robin arbitration scheme to guarantee fairness among input channels. Under this scheme, initially, channel 0 is designated as having the highest round-robin channel priority (hereinafter round-robin priority) and channel 15 is designated as having the lowest round-robin priority. Note that round-robin priority is relevant to the channel order inside the level-specific sub-schedulers and different from the packet priority, which is relevant to the order in which requests are presented from channel modules. Inside the level-specific sub-schedulers, requests are processed between channels in round-robin priority order such that requests from channels with higher round-robin priority are granted access to output channels whenever there is contention with requests from channels with lower round-robin priority. Once the channel with the highest round-robin priority receives a grant, the highest round-robin priority designation is rotated to the next input channel with a pending request. Under this rotating round-robin channel priority approach, every channel will periodically be designated as the highest priority.

High round-robin priority designation plays an especially important role in allowing multicast transmissions through a switch. Multicast requests are difficult to schedule in high-traffic environments, because the likelihood that all output channels are available is low. To guarantee bounded latency for multicast and broadcast traffic, when a channel is designated as the highest round-robin priority, any output channels requested by the channel will be reserved by the scheduler, unless the output channels are required by requests from other channels with higher packet priority until all of the output channels required to grant this request become available.

The priority encoder unit is responsible for implementing the packet priority order and issuing the final grants to the channel modules. When there are one or more possible grants transmitted to the priority encoder unit from the four level-specific sub-schedulers in the current scheduling cycle, the priority encoder unit picks the grant corresponding to the request with the highest packet priority and passes the grant on to the requesting channel module. The priority encoder unit also sends the updated values of the input and output channel utilization to the resource management unit.

The resource management unit is responsible for maintaining the status of the input and output channels. Every time a grant is issued, the input channel that received the grant and the output channels that are going to be used in the packet transfer are marked as busy. When the end of a packet transfer is signaled by the channel module using a done signal, the input channel and the output channel used in the transfer are cleared so that the cleared channels can be scheduled for another transfer.

An advantage of the invention is that the sixteen request buffers with four request registers per buffer utilized in a 16×16 switch are significantly less complex than the 256 queues required for a 16×16 switch using a conventional output-distributed scheduling architecture. In addition, the invention readily allows multicast requests to be granted and the corresponding cells to be transmitted from the input buffers to the output channels. Further, the multi-level request buffers eliminate the HOL blocking problem, because the scheduler has simultaneous and in-parallel access to more than one request for each input channel. The invention also allows for packet-by-packet scheduling of variable-size packets, which eliminates the reassembly overhead associated with cell-based switching systems.

In addition, the invention allows multicast requests to be processed efficiently such that multicast packets are transferred from the source input port to all target output ports simultaneously and multiple multi-cast transfers can be concurrently scheduled from multiple input ports to multiple sets of output ports.

BRIEF DESCRIPTION OF THE DRAWINGS

FIG. 9 is an example matrix of requests from switch input channels 0 through 3 at packet priority levels 0 through 3.

FIG. 10A is an example of the level 1 mask generation for the requests at level 1 in FIG. 9.

FIG. 10B is an example of the level 2 mask generation for the requests at level 2 in FIG. 9.

FIG. 10C is an example of the level 3 mask generation for the requests at level 3 in FIG. 9.

FIG. 11A is an example of the mask compare process for a request shown in FIG. 9.

FIG. 11B is an example of the mask compare process for a request shown in FIG. 9.

FIG. 12 is an example of the level-specific sub-scheduling process for the requests related to FIGS. 9 and 11B.

FIG. 13 is a diagram of the preferred N-channel multi-priority scheduler architecture for the scheduler shown in FIGS. 5 and 6.

FIG. 14 is a depiction of the preferred multi-level in-parallel arbitration process for an N×N switch with M packet priority levels in accordance with the invention.

FIG. 15 is a depiction of the preferred multi-level in-parallel arbitration process for a 16×16 switch with four packet priority levels in accordance with the invention.

DETAILED DESCRIPTION

Figure 1:
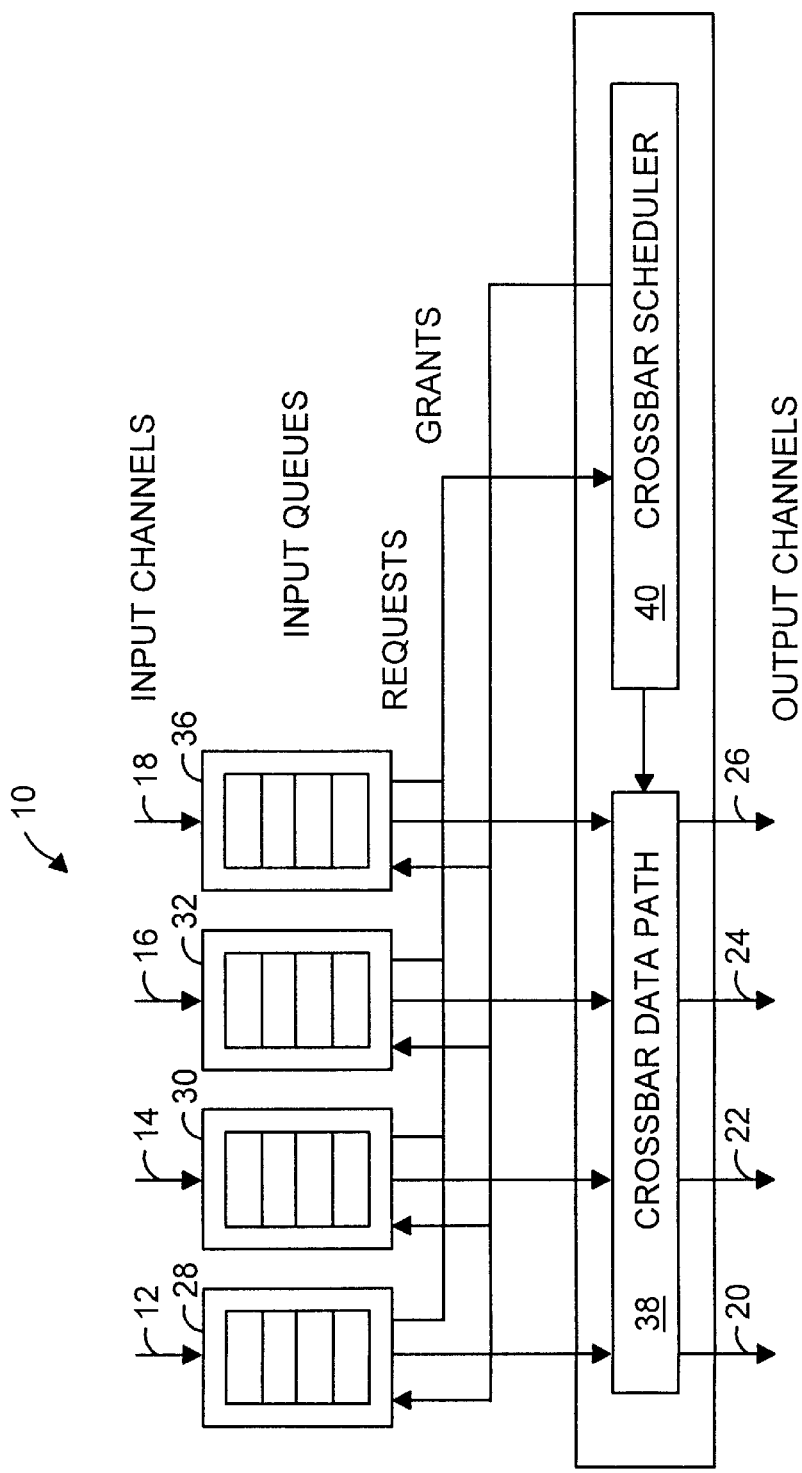
FIG. 1 is a diagram of a prior art switch that has four input channels and four output channels.
Figure 2:
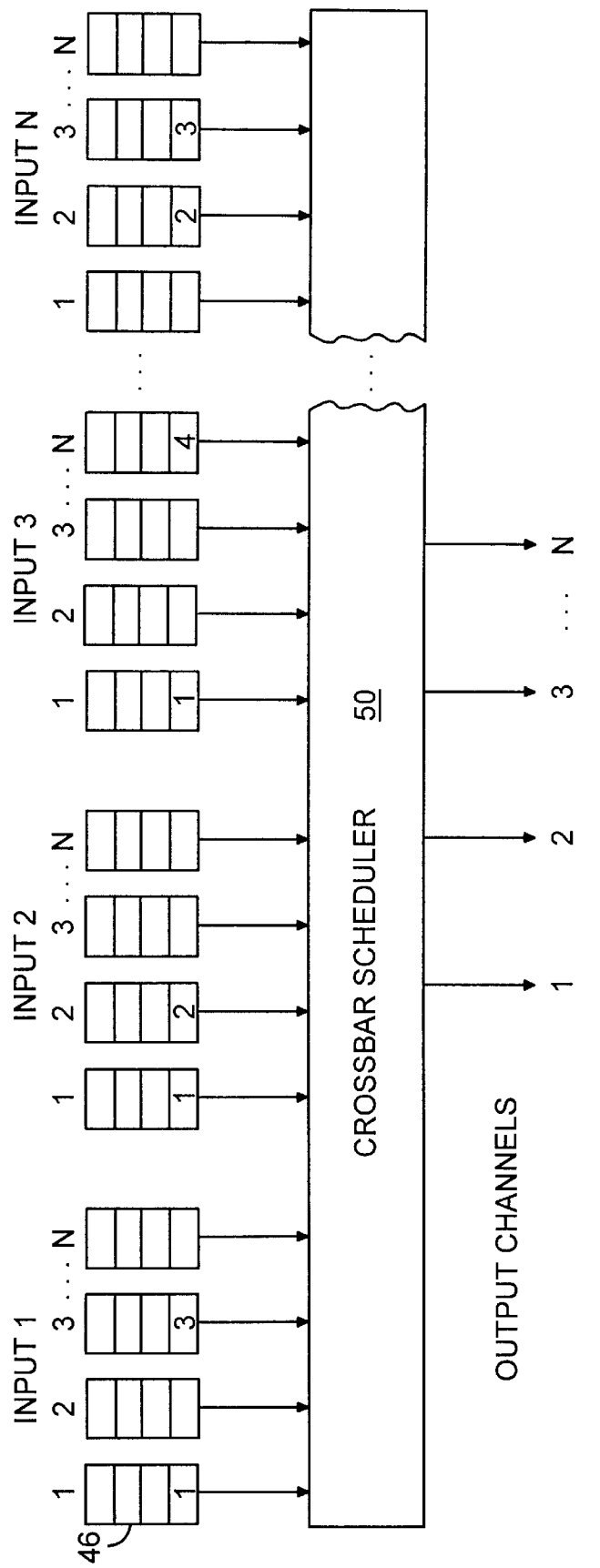
FIG. 2 is an N input channel by N output channel switch with $N^2$ output-distributed input queues.
Figure 3:
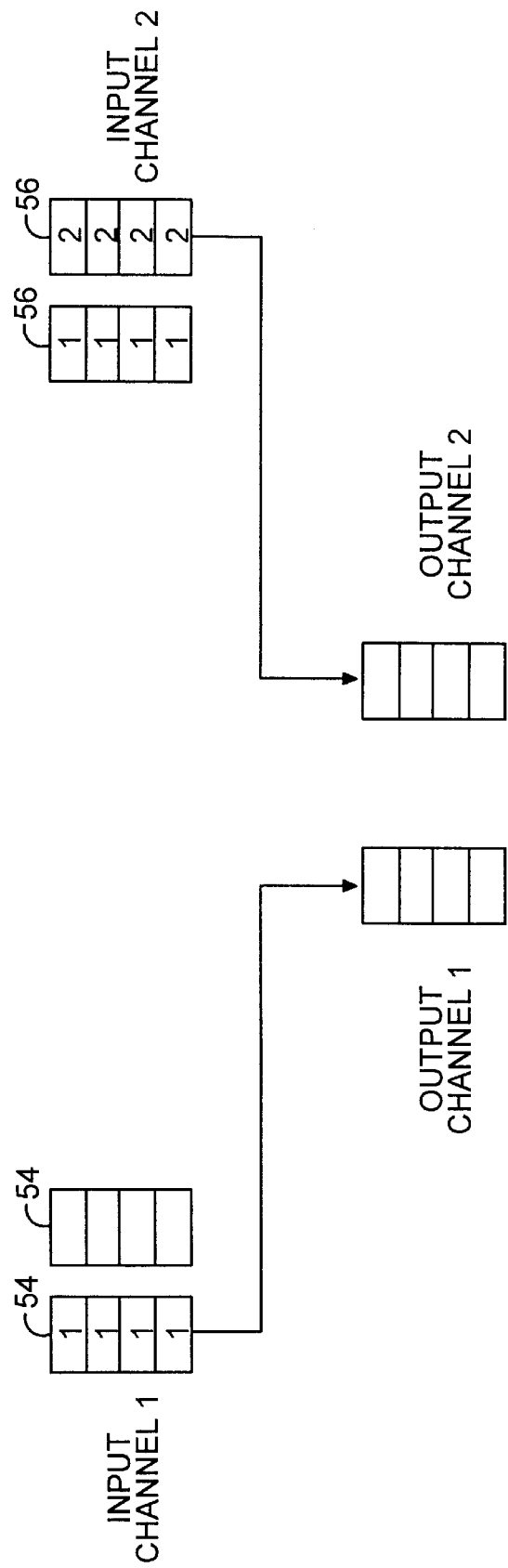
FIG. 3 is a depiction of the transferring of cells from output-distributed input queues to output channels where maximum matching between input and output channels is achieved using prior art techniques.
Figure 4:
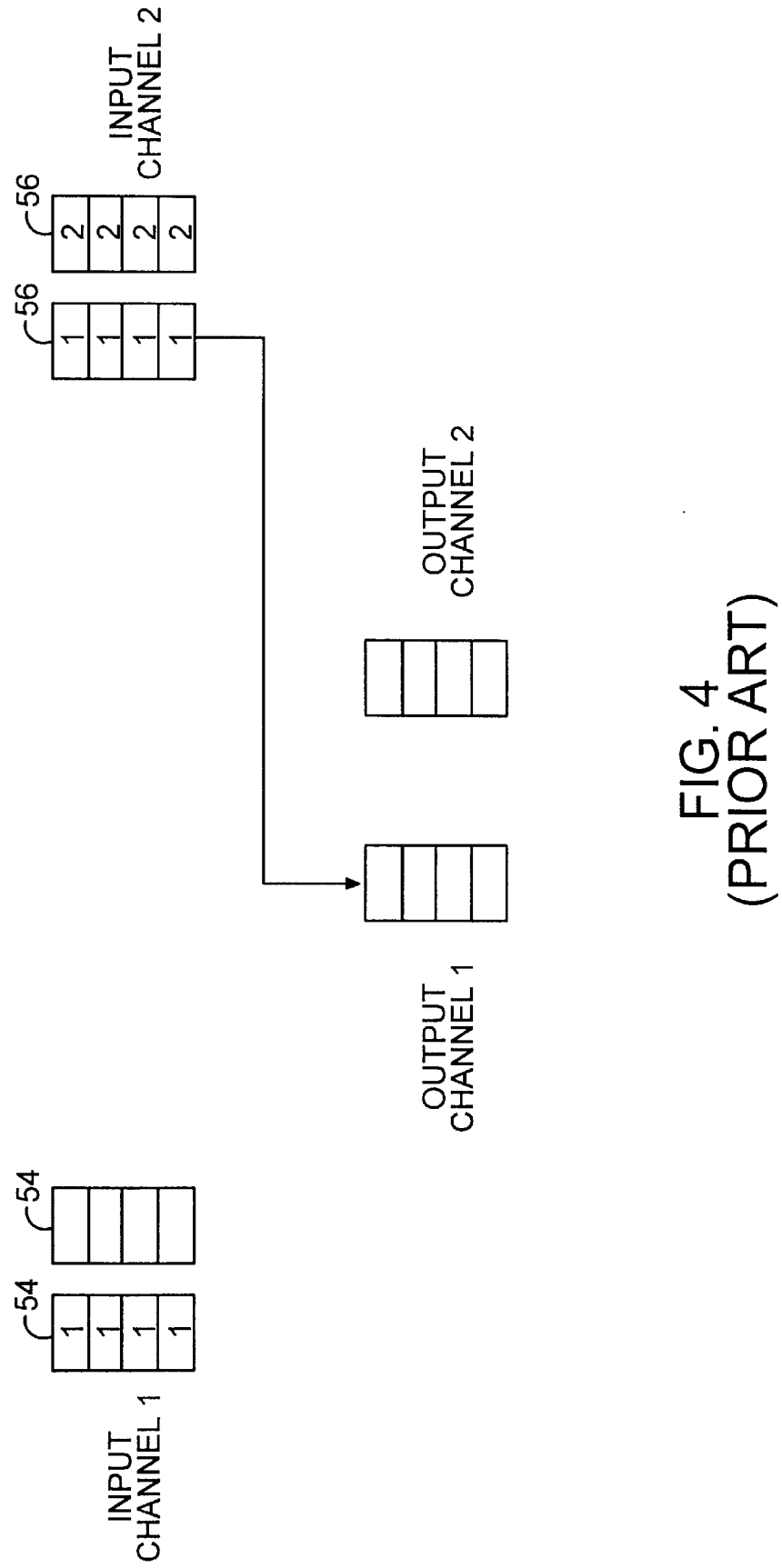
FIG. 4 is a depiction of the transferring of cells from output-distributed input queues to output channels where maximum matching between input and output channels is not achieved using the prior art techniques.
Figure 5:
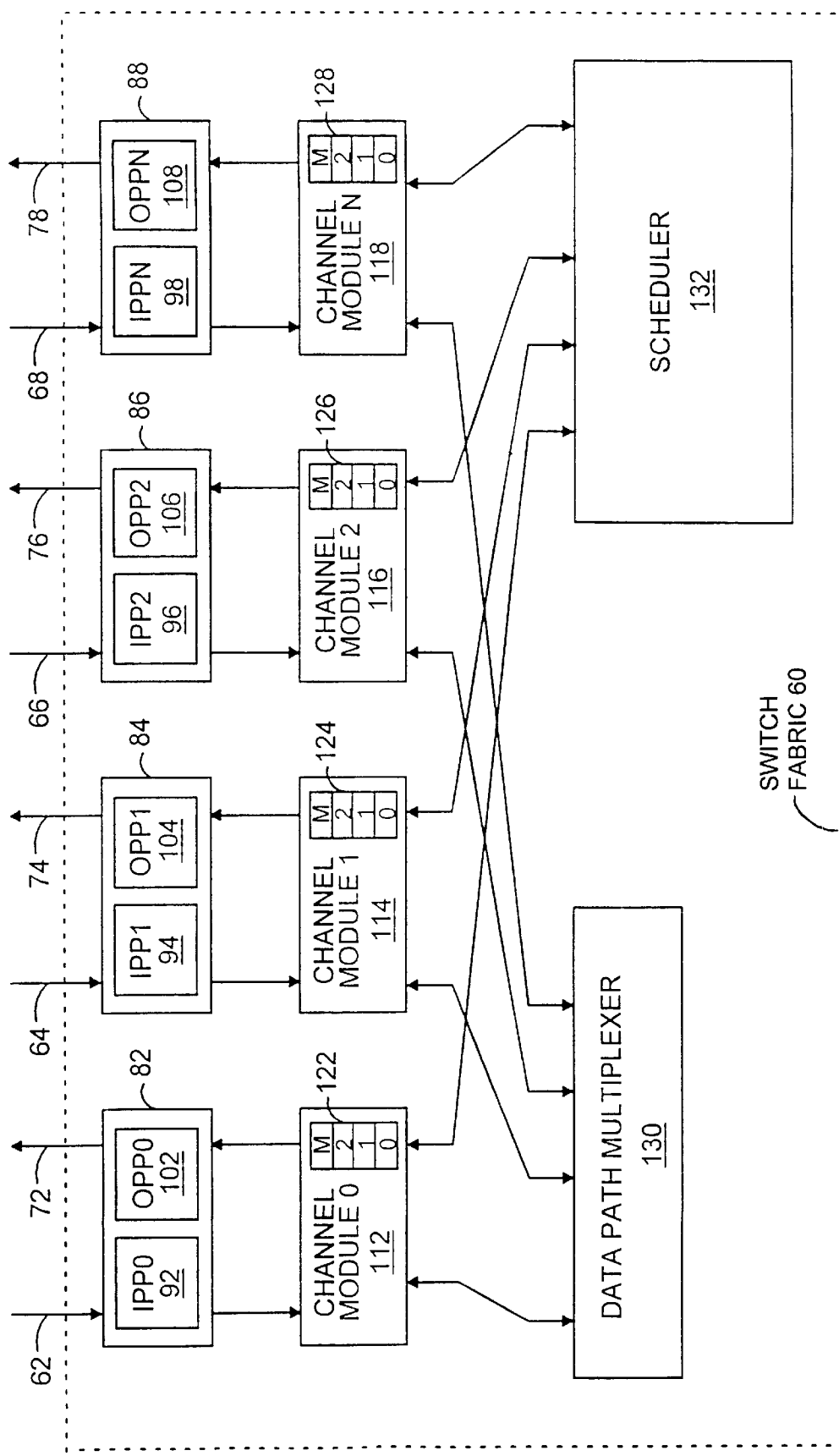
FIG. 5 is a diagram of the switch fabric architecture in accordance with the present invention.

FIG. 5 is a diagram of a preferred embodiment of the invention. For diagram purposes a 4×4 version of an N×N multipoint switch fabric 60 is depicted, although a 16×16 switch is preferred. In the preferred embodiment, the input channels 62, 64, 66 and 68 and output channels 72, 74, 76 and 78 are combined into packet processing units 82, 84, 86 and 88 that include input packet processors (IPPs) 92, 94, 96 and 98 and output packet processors (OPPs) 102, 104, 106 and 108. The IPPs segment incoming variable-sized packets into fixed-length switching cells and buffer the cells before they are switched. Packets arriving at the IPPs can range in size, and may reach a size of thousands of bytes. The IPPs segment the packets into 36-byte fixed-length switching cells.

Figure 6:
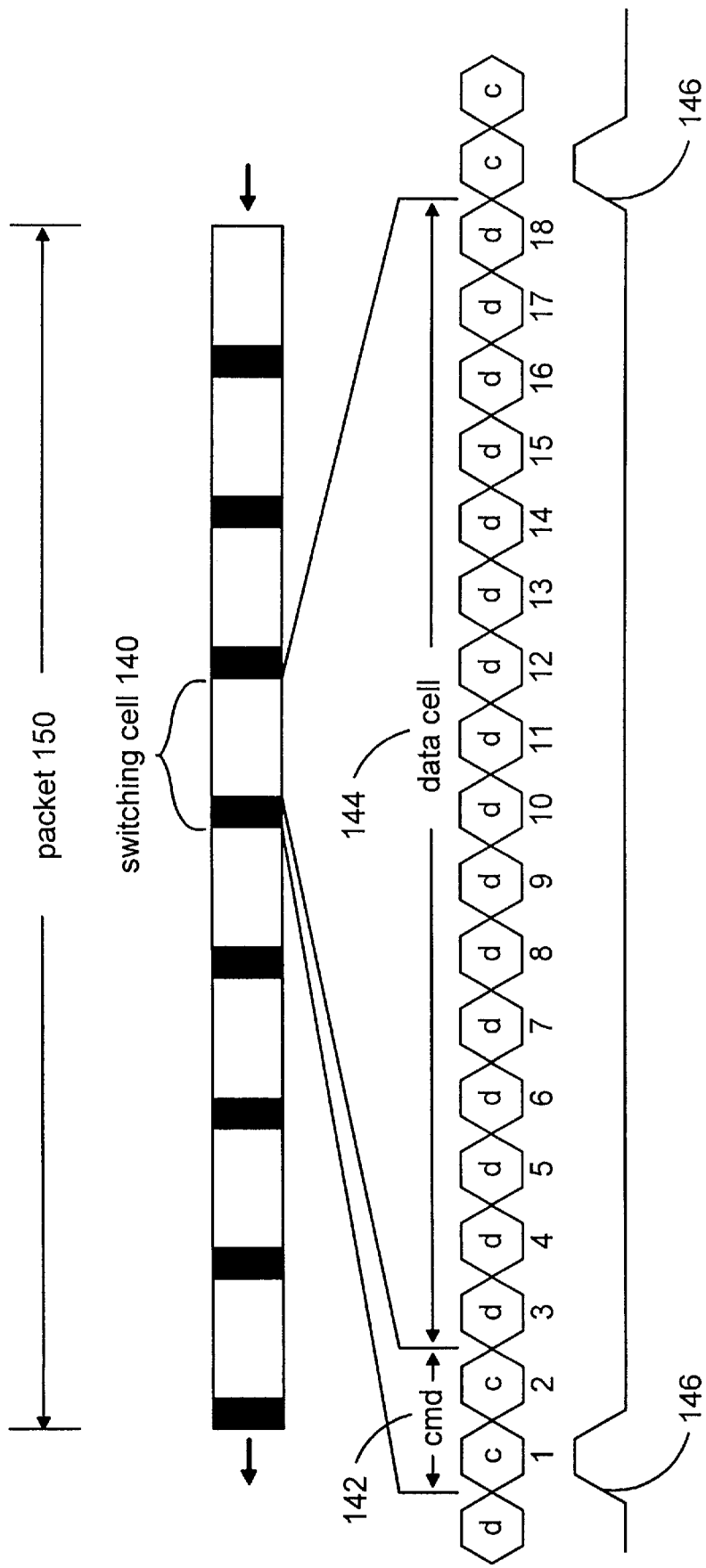
FIG. 6 is a diagram of a data packet and an expanded switching cell that is transmitted through the switch fabric of FIG. 5.

Referring to FIG. 6, each 36-byte switching cell 140 consists of a 4-byte command cell 142 and a 32-byte data cell 144. Using 16-bit channels, each switching cell is sent through the switch over eighteen clocks and a framing pulse 146 is used to indicate the termination of one switching cell and the beginning of an adjacent switching cell. Each command cell consists of two command fields. The first command field contains a request or response that is used to exchange messages related to switching arbitration. The second command field contains a data identifier that carries information relating to the data cell in the current switching cell. The data cell carries the data that is a part of a larger packet 150 from which the switching cell was segmented. After the switching cells pass through the data path multiplexer, the data cell portions of the switching cells are reassembled into variable-length packets by the OPPs for transmission within the network.

Referring back to FIG. 5, switching cells are transmitted between the IPPs/OPPs 92–98 and 102–108 and the corresponding channel modules 112, 114, 116 and 118. The channel modules execute a synchronization protocol for each channel, perform a cyclic redundancy check (CRC) for incoming requests, and generate a CRC for outgoing acknowledge messages. The channel modules are also responsible for routing the command and data cells to the proper locations within the switch. For efficiency purposes, the command cells that are transmitted between the channel modules and the IPPs/OPPs are piggybacked onto data cells to form complete 36-byte switching cells, even though the command cells are not likely to be directly related to the data in the data cells they are traveling with. The channel modules demultiplex the command cells from the data cells and write the request portions of the command cells to a request buffer.

Figure 7:
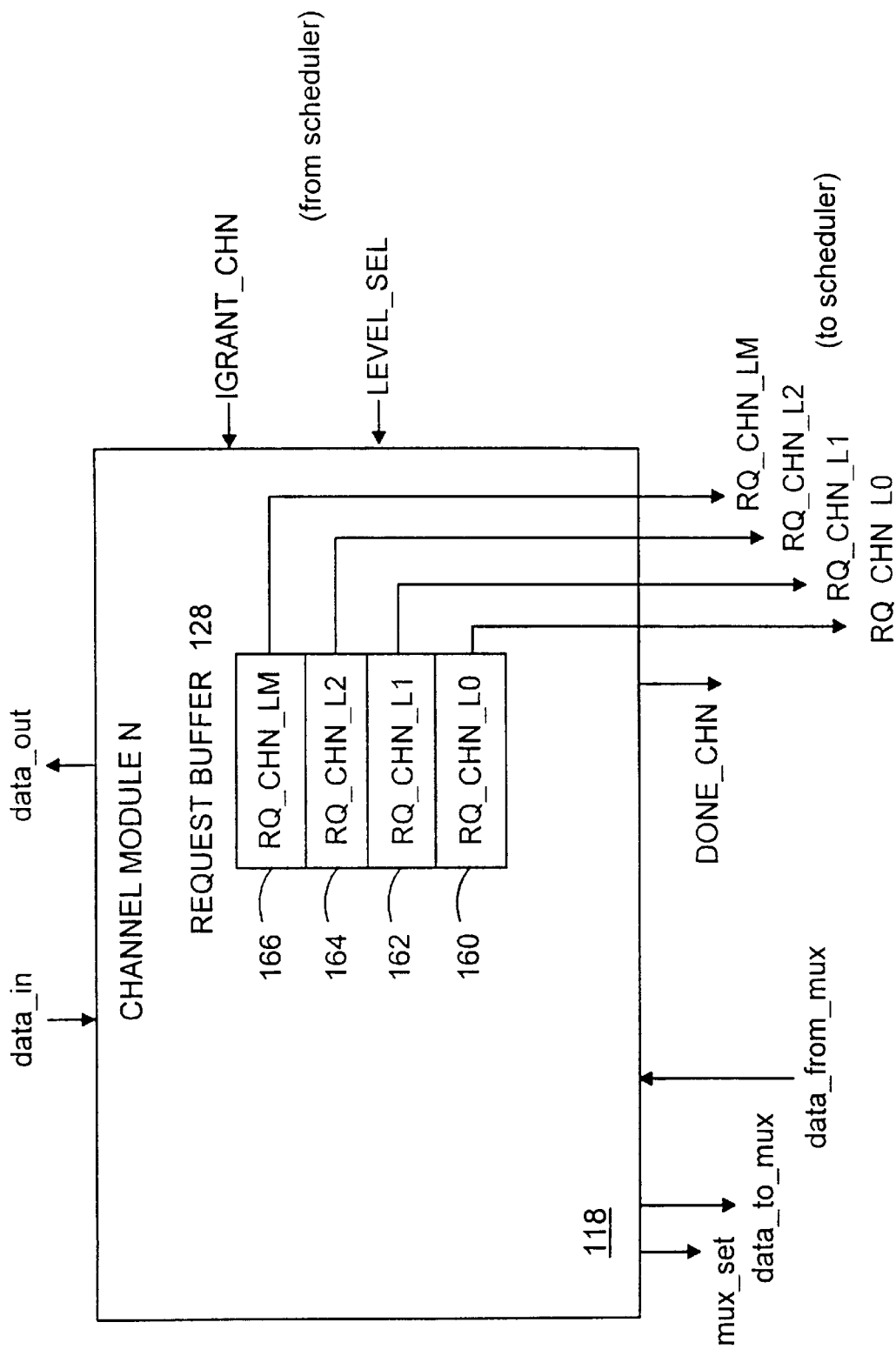
FIG. 7 is an expanded diagram of a channel module as shown in FIG. 5.

FIG. 7 is an expanded diagram of an example channel module N 118. The channel module of FIG. 7 has a request buffer 128 that can store M requests 160, 162, 164, 166 in M request registers and that can provide M requests to a scheduler in parallel. In the preferred 16×16 switch, M is equal to 4. That is, there can be up to four requests stored in each of sixteen request buffers for a total of sixty-four requests. With one buffer per channel and four request registers per buffer, a 16×16 switch has only sixteen buffers and provides only sixty-four requests to a scheduler per arbitration cycle, in comparison to a conventional 16×16 switch with output-distributed queues which would require $N^2$, or 256, request buffers and would provide $N^2$, or 256, requests to a scheduler per arbitration cycle.

The request buffers 122–128 of FIGS. 5 and 7 are filled from the IPPs 92–98 in different manners, depending on what packet priority scheme is being implemented in the switch. If the packet priority scheme is based upon time, where the oldest request has the highest packet priority, then the buffer is filled on a FIFO basis. In FIG. 7, the request buffer 128 for channel N has four request register designations 160, 162, 164 and 166 from bottom to top, level 0 (L,0), level 1 (L1), level 2 (L2), and level M (LM), where register L0 is the highest priority and register LM is the lowest priority. In this packet priority scheme, register L0 contains the oldest request and register LM contains the newest request. Whenever a grant is issued in response to a request, the request buffer adjusts on a FIFO basis, thereby leaving a vacant request register at the lowest priority, LM. The vacant request register 166 is then available to receive a new request from the IPP 98.

On the other hand, the packet priority scheme may be based upon a factor other than time. For example, the packet priority scheme may be based upon the source of the data or the type of data. Under such a packet priority scheme, the four registers 160–166 in the request buffer 128 can be identified, for example, as control, high, medium, and low priority, with control being the highest packet priority (i.e., L0) and low being the lowest packet priority (i.e., LM). When a request is granted under this scheme, the vacant request register is resupplied with a request having the same packet priority level as the request for which a grant was just issued.

FIG. 7 also depicts the specific input and output links associated with each channel module, using channel N as an example. The data_in and data_out links located at the top of the channel module 118 are used to transport command cells, data cells, grants and level selects between the channel module and the IPP/OPP. The input grant link (IGRANT_CHN) and level select link (LEVEL_SEL) located at the right side of the channel module are used to transport the IGRANT_CHN signal and LEVEL_SEL signal from the scheduler to the channel module. The IGRANT_CHN signal represents an input grant that has been issued by the scheduler for channel N. The LEVEL_SEL signal represents the packet priority level that corresponds to the IGRANT_CHN signal. For example, the LEVEL_SEL signal will identify one of the levels L0 through LM corresponding to a CHN grant.

The channel N request links level 0 through level M (RQ_CHN_L0 through RQ_CHN_LM) and the done link (DONE_CHN) located at the bottom right of the channel module 118 are used to transport the channel requests and a done signal to the scheduler. The M request links are routed to the scheduler in parallel and provide the M requests to the scheduler simultaneously. As will be discussed further, providing parallel delivery of M requests helps to minimize the HOL blocking problem discussed above. The request links in the preferred 16×16 switch are 16-bit channels that carry requests that include a 16-bit crossbar exit channel descriptor (CEP). The 16-bit CEP has one bit associated with each output channel, and the desired output channels are identified by setting the bits that correspond to the output channels.

The DONE_CHN signal indicates to the scheduler when the input channel has completed transmitting the current group of switching cells. Switching cells that are segmented from the same packet are ideally transmitted one after another. Since packets are variable length and are therefore made up of a variable number of switching cells, it is preferred that the scheduler be informed when an input channel has completed transferring of a group of switching cells. The DONE_CHN signal is also used to determine which output channels have become available to receive switching cells. Determining available output channels from a DONE_CHN signal that indicates the availability of an input channel is accomplished through a look-up table. A look-up table is updated each time a grant is issued to an input channel. The look-up table identifies which output channels will be utilized by the input channel for the granted cell transfer. When a DONE_CHN signal is received by the scheduler, the look-up table for the corresponding input channel is accessed and the identified output channels in the look-up table are released and made available for future switching.

The data to and from the multiplexer links (data_to_mux and data_from_mux) and the multiplexer setup link (mux_set) located at the bottom left of the channel module 118 are used to transfer data cells to and from the multiplexer and to set up the data paths within the multiplexer for the transfer of switching cells.

Although not represented, the channel module 118 also performs a time-out function to limit the amount of time and therefore the number of cells that can be transferred uninterrupted by a single input/output channel combination. Every time a grant is issued to an input channel, a timeout counter in the corresponding channel module is set to the timeout value. During every successive clock cycle, the timeout counter is decremented and if the input channel cannot complete the transfer within the timeout period, the timeout counter expires and the transfer is terminated. In the preferred embodiment, the timeout counters in the channel modules are set to allow up to 4,096-byte packets to be switched in one uninterrupted event.

Referring back to FIG. 5, the channel modules 112–118 are connected to a data path multiplexer 130 that provides the physical paths for data cell switching between channels. The preferred data path multiplexer has the ability to unicast data cells and to multicast data cells. In the preferred embodiment, the data path multiplexer is a multipoint switch, although in another embodiment the data path multiplexer can be a crossbar switch. The type of data path multiplexer is not critical to the invention.

The channel modules 112–118 are also connected to a scheduler 132, The scheduler utilizes the requests from the channel modules to manage the cell traffic through the data path multiplexer in a manner that maximizes the throughput of switching cells without unfairly delaying lower priority data.

Figure 8:
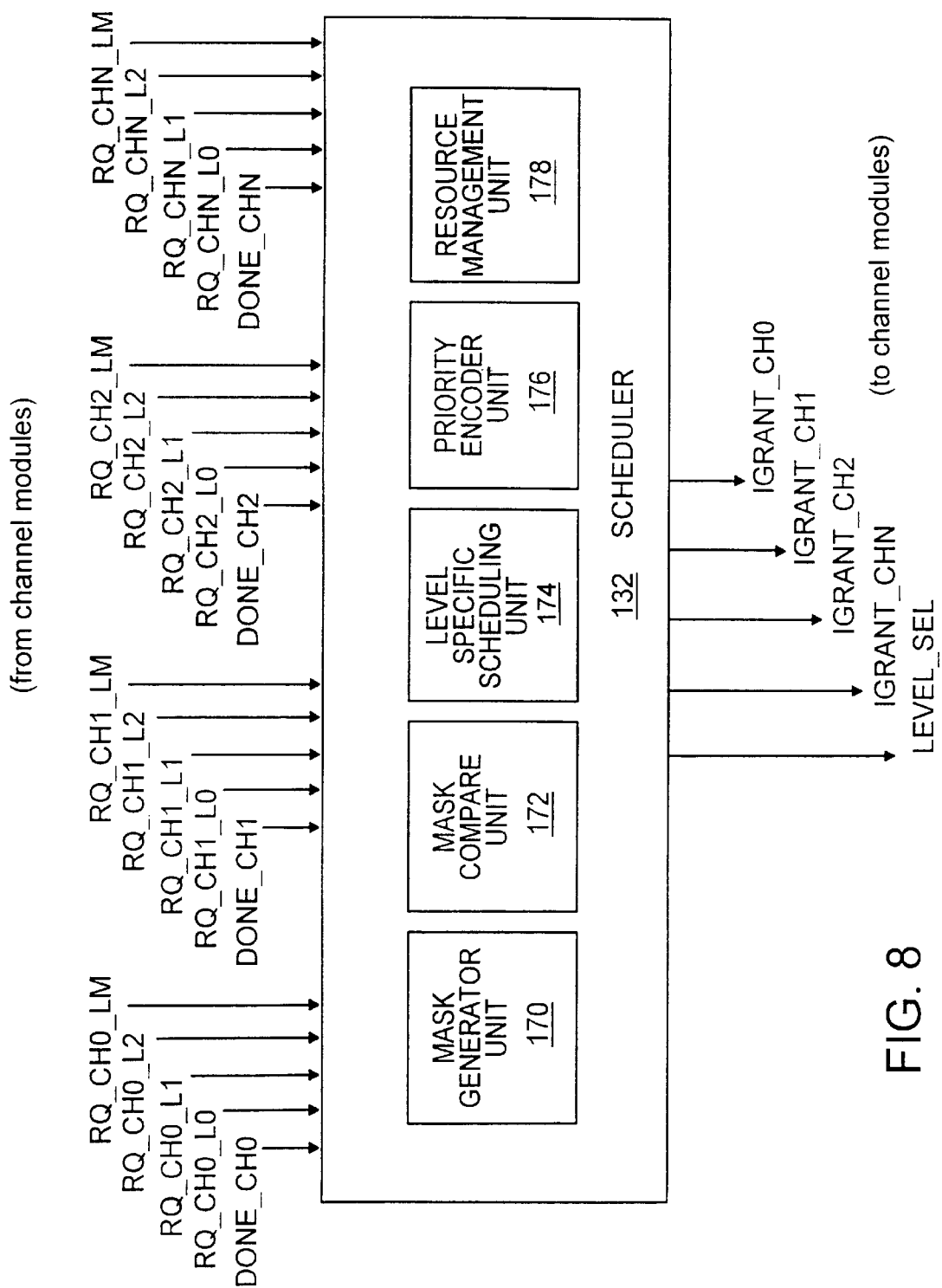
FIG. 8 is an expanded diagram of the scheduler as shown in FIG. 5.

FIG. 8 is an expanded view of the scheduler 132. The scheduler is first described in terms of the input and output links and then in terms of the functional blocks within the scheduler that operate to generate the output signals. Located along the top of the scheduler, request links and done signal links are connected to the scheduler for receiving requests and done signals from the channel modules as depicted in FIG. 7. Each channel has M parallel request links between the channel modules and the scheduler and in the preferred embodiment there are four parallel request links per channel. The highest packet priority request link is identified as, for example, RQ_CH0_L0, where "RQ" is short for request, "CH0" is short for channel 0, and "L0" is short for packet priority level 0. As described above, each request link consists of 16-bit channels where a 16-bit field is delivered to the scheduler in a single clock. The DONE_CH0 signal is received from the channel module and indicates when an input is available and what corresponding outputs are available.

The output links located along the right side of the scheduler include a grant link for each channel and a level select link. As described with reference to the channel modules, the grant links transmit the IGRANT_CHN signals generated within the scheduler to the channel modules to indicate that a request from a particular channel has been granted. The LEVEL_SEL link transmits a LEVEL_SEL signal to the channel module along with each grant to indicate the packet priority level of the granted request. For example, if a request is granted to channel N, the LEVEL_SEL signal indicates to channel module N the particular packet priority level of the request.

The functional blocks within the scheduler depicted in FIG. 8 include a mask generator unit 170, a mask compare unit 172, a level-specific scheduling unit 174, a priority encoder unit 176, and a resource management unit 178. The mask generator unit is a circuit that generates packet priority level-specific masks that are utilized in the arbitration process to indicate which output channels will be utilized by the input channels for a specific packet priority level. In the preferred 16×16 switch, a level-specific mask consists of a 16-bit vector where each bit is dedicated to one of the output channels. A level-specific mask is generated by combining all of the request vectors from the request channels 0–15 for the same packet priority level to form a single mask vector that represents all of the requests.

In an example related to the N×N switch of FIG. 5, masks are generated from the requests of input channels 0–3, CH0–CH3, having packet priority levels 1 through 3, L1–L3. The channels 0–3 are the input channels 62–68, respectively. For example purposes, FIG. 9 represents the requests from channels CH0–CH3 at packet priority levels L0–L3. FIGS. 10A–10C represent the mask generation for the L1_MASK, the L2_MASK and the L3_MASK. The L1_MASK is generated from the aggregate of the requests for channels CH0 through CH3 at packet priority level L0. The mask, represented in FIG. 10A as L1_MASK, has a bit set to "1" at any place where an L0 request for any channel was set to "1." The end result is that the mask represents all outputs that are requested by the stored requests that are designated as having the highest packet priority levels. As depicted in FIGS. 10B and 10C, the L2 and L3 masks are generated by building on the lower level masks in the same manner. The highest packet priority level mask, L0_MASK (not shown), is generated by simply copying the highest packet priority request that is related to the channel with the highest round-robin priority designation. Round-robin priority refers to a priority scheme among channels that is used in the arbitration process and will be discussed further below. Preferably, all of the masks are regenerated once before each eighteen clock arbitration cycle, but the masks can be regenerated every clock, if desired. The algorithms for creating four masks for an N×N switch are as follows:

```
L0_MASK = RQ_CHX_L0, where CHX is the channel with the
          "high priority" designation
L1_MASK = (RQ_CH0_L0) | (RQ_CH1_L0) |... (RQ_CHN_L0)
L2_MASK = L1_MASK | (RQ_CH0_L1) | (RQ_CH1_L1) |
          ... (RQ_CHN_L1)
L3_MASK = L2_MASK | (RQ_CH0_L2) | (RQ_CH1_L2) |
          ... (RQ_CHN_L2)
```

In the operation of the L1, L2, and L3 masks, requests from input channels which are unavailable are not included in the mask generation algorithm.

The next functional block in FIG. 8 is the mask compare unit 172. The mask compare unit is a circuit that compares level-specific masks to the availability of the input channels and to the requests from the corresponding priority level, while monitoring for conflicts between available inputs, requested outputs, and the mask. The availability of inputs is represented by an input vector (IVEC) that is an N bit vector where N equals the number of input channels in the switch. In the 4×4 switch example, the IVEC is a 4-bit vector with unavailable input channels having a corresponding bit set to "1." Referring to FIGS. 11A and 11B, examples of the mask compare process are depicted. In the example of FIG. 11A, the request used, RQ_CH1_L1, is taken from FIG. 9 and includes the 4-bit request vector "0010." The input vector, IVEC, is exemplary and is the 4-bit vector "0100," representing that input channel 1 is unavailable or busy. Since the unavailable input channel is the same as the input channel making the request, the request cannot be granted to the busy channel and all request bits are set to "0." The resulting request is compared to the L1_MASK, which represents the higher priority output channel requests from L0. Since the resulting RQ_CH1_L1 is the 4-bit vector "0000," a request for zero output channels is passed on to the level-specific scheduling unit.

In the example of FIG. 11B, request RQ_CH2_L1 is taken from FIG. 9 and is the 4-bit request vector "0010." The input vector is exemplary and is the same 4-bit vector "0100" as used in the previous example. Since the input vector indicates that only input channel 1 is unavailable and the request is from input channel 2, the resulting request vector remains "0010." The L1_MASK vector is again "1001" which represents that output channels 0 and 3 have been or will be requested by higher priority requests for output channels. The L1_MASK does not conflict with the request and as a result, the scheduler will pass on RQ_CH2_L1 as the vector "0010."

Referring back to FIG. 8, the next functional block is the level-specific scheduling unit 174. The level-specific scheduling unit is a circuit that contains a level-specific sub-scheduler for each packet priority level. In the preferred embodiment of the 16×16 switch, there are four packet priority levels and therefore four level-specific sub-schedulers. The level-specific sub-schedulers receive the level-specific requests that are output from the mask compare unit 172 and compare input and output vectors to the requesting channel and to the request vector to determine if channel conflicts exist. If no channel conflicts exist between the input vector, output vector, requesting channel, and request vector, a grant is issued and the input and output vectors are set to reflect the new grant.

The level-specific sub-scheduling units utilize a round-robin arbitration scheme to guarantee fairness among requests of the same priority level. Under the round-robin scheme, initially, channel 0 is designated as having the highest round-robin channel priority and channel 15 is designated as having the lowest round-robin priority. Note that round-robin priority is relevant to the channel priority order inside the level-specific sub-schedulers and is different from the packet priority, which is relevant to the order in which requests are presented from channel modules. Inside the level-specific sub-schedulers, requests are processed between channels in round-robin priority order such that requests from channels with higher round-robin priority are granted access to output channels whenever there is contention with requests from channels with lower round-robin priority. Once the channel with the highest round-robin priority receives a grant, the highest round-robin priority designation is rotated to the next input channel with a pending request. Under the rotating round-robin channel priority approach, every channel will periodically be designated as the highest priority.

High round-robin priority designation plays an especially important role in allowing multicast transmissions through a switch. Multicast requests are difficult to schedule in high-traffic environments, because the likelihood that all output channels are available is low. To guarantee bounded latency for multicast and broadcast traffic, when a channel is designated as the highest round-robin priority, any output channels requested by the channel will be reserved by the scheduler, unless the output channels are required by requests from other channels with higher packet priority until all of the output channels required to grant the request become available.

An example of the level-specific sub-scheduling process is depicted in FIG. 12 for one packet priority level. For the example, assume that channel 2 has the highest round-robin priority. The example is a continuation of the example of FIG. 11B. In FIG. 12, the input vector is still "0100," the exemplary output vector is "0001," and the request RQ_CH2_L1_is "0010." The input vector indicates that input channel 1 is busy and the output vector indicates that output channel 3 is busy. The request RQ_CH2_L1 is for input channel 2 to transmit a cell to output channel 2, neither of which conflicts with the input vector or output vector. Since no conflicts exist between the request, the requesting channel, the input vector, and the output vector, a grant with vector "0010" is issued for CH2_L1. Along with the grant, the level-specific sub-scheduling unit also generates updated input and output vectors that represent the IVEC and the OVEC that will be utilized if the request is granted. The updated input vector and output vector are identified as IVEC_NEXT_L1 and OVEC_NEXT_L1. In the example, IVEC will change from "0100" to "0110" to signify that input channel 2 will also be busy and OVEC will change from "0001" to "0011" to indicate that output channel 2 will also be busy.

Referring back to FIG. 8, the next functional block is the priority encoder unit 176. The priority encoder unit is a circuit that is responsible for implementing the packet priority order and issuing the final grants to the channel modules. When there are one or more possible grants transmitted to the priority encoder unit from the four level-specific sub-schedulers in the current scheduling cycle, the priority encoder unit picks the grant corresponding to the request with the highest packet priority and passes the grant on to the requesting channel module. The priority encoder unit also sends the updated values of the input and output channel utilization to the resource management unit to update IVEC and OVEC.

Referring back to FIG. 8, the resource management unit 178 is responsible for maintaining the status of the input and output vectors IVEC and OVEC, respectively. Every time a grant is issued, the input vector bit related to the input channel that received the grant and the output vector bit related to the output channels that are going to be used in the packet transfer are marked as busy. When the end of a packet transfer is signaled by the channel module using a done signal, the respective input vector bits and output vector bits marked during the transfer are cleared so that the channels can be scheduled for another transfer.

FIG. 13 is a diagram of the preferred N-channel multi-priority scheduler architecture that includes the mask generator unit 190, mask compare sub-units 192,194, 196 and 198, the level-specific sub-scheduling units 202, 204, 206 and 208, the priority encoder unit 210, and the resource management unit 230. The preferred architecture reflects a scheduler where M, the number of packet priority levels and request buffer registers per channel, is equal to 4. Following a logical flow, a request, for example, RQ_CH0_L0 enters a mask compare sub-unit 192 at the request input (RI). The level 0 mask enters the mask compare sub-unit at MSK and an input vector, IVEC, enters at INP_BSY. The vectors are compared as described above, and a request is output from the request output (RO) to an N:1 multiplexer 212. The N:1 multiplexer designates the request as high priority where applicable and forwards the request to a sub-scheduling unit 202 of the level-specific scheduling unit for L0. The input vector, IVEC, and an output vector, OVEC, are input into the level-specific sub-scheduling unit from the resource management unit along with the request for channel 0 at level 0, RQ_CH0_L0 from the mask compare sub-unit.

A, grant is issued from the level-specific sub-scheduling units 202–208 based on the availability of input channels and output channels and the round-robin priority as described above. The updated input and output vectors are sent to respective multiplexers as IVEC_NEXT_L0 and OVEC_NEXT_L0, while the grant is sent to the priority encoder unit as IGRANT_L0.

The priority encoder unit 210 receives four grants from the four level-specific sub-scheduling units 202–208 for each channel. A single grant for a single channel is issued by the priority encoder unit based on packet priority level. That is, the grant with the highest packet priority level is selected among the four available grants and, therefore, if there is a grant for an output channel from level 0, it has priority over all other packet priority levels for the channel. Similarly, if there are no grants for packet priority levels L0 and L1, but there are grants for packet priority levels L2 and L3, then the L2 grant is issued and the L3 grant must wait for a later arbitration cycle.

If a grant is issued to the high priority channel, then the high priority designation is shifted to the next channel. The preferred channel priority architecture 240 is depicted in FIG. 13. After being processed through the priority encoder unit, the grant issued based on packet priority level is transmitted to the corresponding channel module accompanied by a level select signal that identifies which packet priority level the request relates to and where in the request buffer the request is located.

Although the functions of the overall scheduler unit have been specifically described, it is important to note that the functions may be performed in different orders. For example, it is possible to perform the level-specific sub-scheduling function before the mask compare function. In addition, the process of accounting for input and output channel availability as performed by the resource management unit may differ. Further, the physical boundaries may vary from those described. For example, certain functions such as mask generation may be performed outside the physical boundaries of the scheduler.

The preferred arbitration method is further explained with reference to FIG. 14, which graphically represents buffered requests from an N-channel multipoint switch. The channel modules have the ability to buffer M requests in their respective buffers with a packet priority designation that ranges from a highest packet priority at level 0, L0, to a lowest packet priority at level M, LM. In the preferred embodiment, N is 16, indicating sixteen channels CH0–CH15 and M is 4, indicating four request storage registers and four corresponding packet priority levels L0–L3 related to each channel for a total of 4×16=64 request buffer registers.

In the preferred arbitration method, packet priority refers to the priority level of one buffered request for a channel versus another buffered request for the same channel. Time is used as the packet priority basis in this embodiment and under the time approach L0 contains the oldest request in the buffer and has the highest packet priority. Levels 1, 2, and 3 contain sequentially newer requests and have sequentially lower packet priority. Round-robin priority refers to the channel that is designated as high round-robin priority under the rotating round-robin channel priority scheme. As described above, once a channel is designated as high round-robin priority, the channel maintains the designation for successive arbitration cycles until a grant is issued for the channel. Round-robin priority after the high priority channel is distributed sequentially in descending order from the high round-robin priority channel. For example, if CH13 is the highest round-robin priority channel, CH14 is the next highest round-robin priority, CH15 is the next highest round-robin priority, and CH0 is the next highest round-robin priority, with the pattern continuing until CH12, which is the lowest round-robin priority channel.

With the priority protocol established, the preferred multilevel in-parallel arbitration (MLIPA) process is described with reference to FIG. 15. In the example, it is assumed that L0 is designated high packet priority and channel 0 has the highest round-robin priority. Therefore, in the first clock, phase 1, the four requests, L0–L3, for CH0 are arbitrated as described above. Simultaneously, the L0–L3 requests are processed through the mask compare unit, the level-specific scheduling unit, and the priority encoder unit. Out of the parallel process, one request from one of the four packet priority levels will be granted. Remembering that CH0 is the highest priority channel, it is likely that the CH0_L0 request will receive the grant even if it is a multicast request that requires available output channels to be reserved while unavailable output channels become available.

In the next clock, phase 2, the four requests, L0–L3, for CH1 are arbitrated as described above. The arbitration of the four requests is performed in parallel and, if possible, one request is issued for the channel. In the next clock, phase 3, the four requests, L0–L3, for CH2 are arbitrated as described above. As can be seen, the arbitration continues for sixteen clocks and at the end of sixteen clocks sixty-four requests have been arbitrated and grants have been issued in a manner that maximizes input channel and output channel utilization.

A complete arbitration cycle requires eighteen clocks, two clocks for arbitration preparation and sixteen clocks for arbitration. The sixteen clocks that are required to arbitrate the sixty-four requests are synchronized to the sixteen clocks that are required to transmit the data cell portion of a switching cell, as described with reference to FIG. 6. Before a new sixteen clock arbitration process begins, and during the two clocks required to transmit the command cell portion of the next switching cell, preparations are made for the next arbitration process. In the first clock, all of the done signals are reviewed and the channels that have become available during the preceding arbitration cycle are released by clearing the appropriate input vectors and output vectors. Additionally, in the first clock the request buffers are replenished to fill request registers vacated by the requests that were granted in the last arbitration cycle. In the second and last clock before the next arbitration begins, new masks, that reflect the newly replenished buffers, are generated for the four packet priority levels and the round-robin priority is rotated if the highest round-robin priority channel received a grant in the last arbitration cycle.

Figure 16:
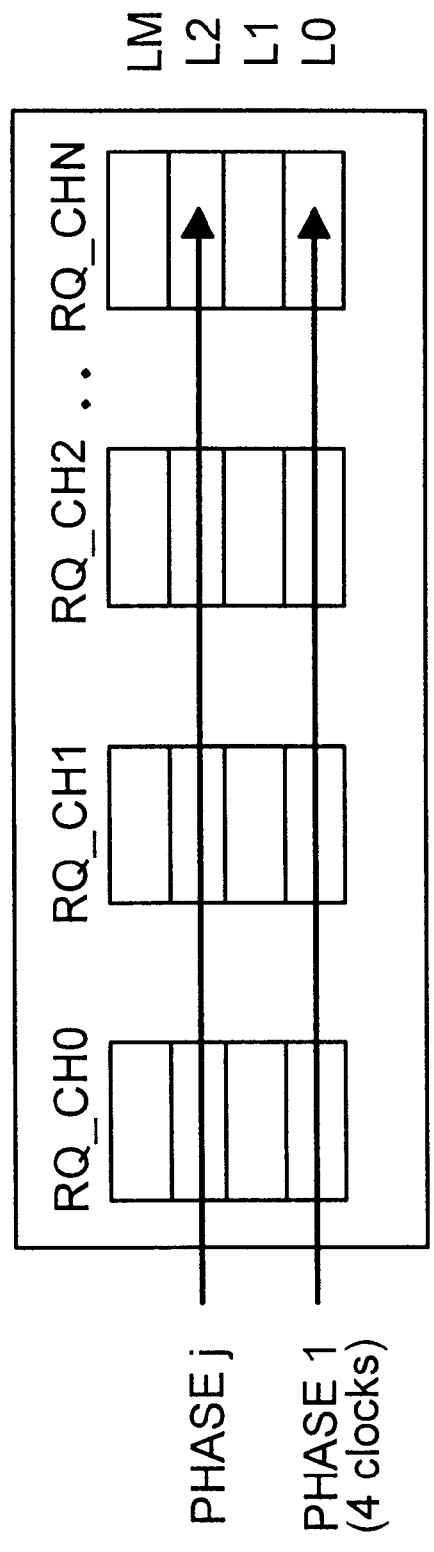
FIG. 16 is a diagram of an alternative single level, single channel arbitration process for an N×N switch with M packet priority levels in accordance with the invention.

In an alternative arbitration method, the requests in the request buffers can be arbitrated one request at a time, one packet priority level at a time, as depicted in FIG. 16. In the preferred embodiment where N=16 and M=4, the arbitration process would arbitrate sixty-four requests in sixty-four clocks. The arbitration would start at the highest round-robin priority and highest packet priority request, for example, RQ_CH0_L0. Phase 1 requires sixteen clocks, phase 2 requires sixteen clocks, phase 3 requires sixteen clocks, and phase 4 requires sixteen clocks for a total of sixty-four clocks. Grants are issued on a first request-first grant basis with the round-robin priority rotating each arbitration cycle as described above. An advantage of this approach is the simplicity found in the fact that mask generation, mask comparing, and parallel arbitration are not being performed. A disadvantage is that one arbitration cycle takes sixty-four clocks as opposed to eighteen clocks per cycle for the arbitration method described above.

What is claimed is:

1. An apparatus for scheduling packets in an input-buffered multipoint switch comprising:

a plurality of input channels;

a plurality of output channels;

multi-level request buffers, each multi-level request buffer being specific to one of said plurality of input channels, said multi-level request buffers having discrete levels for storing requests having different packet priorities; and a scheduler circuit, connected to said multi-level request buffers, to indicate a transmission status for each of said input and output channels, said transmission status being indicative of channel availability, arbitrate among a totality of said requests stored in all of said levels of said plurality of multi-level request buffers at least partially based upon a combination of said packet priorities and said transmission statuses of said input and output channels, and issue grants to said requests in a sequence based upon said arbitrating among said totality of requests.

2. The apparatus of claim 1 further comprising parallel links between each level of said multi-level request buffers and said scheduler circuit, said scheduler circuit being enabled to simultaneously access all of said levels of each said request buffer.

3. The apparatus of claim 1 wherein said scheduler circuit further includes a mask generator circuit operationally connected to said multi-level request buffers to generate output vectors that are indicative of each output channel that is requested at each of said different packet priorities, each said output vector being associated with one of said packet priorities.

4. The apparatus of claim 3 wherein said scheduler circuit further includes a mask comparator circuit operationally connected to said mask generator circuit and said multi-level request buffers to compare each particular output vector to associated requests having a packet priority associated with said each particular output vector, said mask comparator circuit having a plurality of outputs, each output being responsive to said comparing of said each particular output vector to said associated requests and being indicative of availability of output channels represented by said associated requests.

5. The apparatus of claim 4 wherein said scheduler circuit further includes a plurality of sub-scheduler circuits, each sub-scheduler circuit being operationally connected to an associated output of said mask comparator circuit to geneate a level-specific grant for a request having an available input channel and available requested output channels.

6. The apparatus of claim 5 wherein said scheduler circuit further includes a priority encoder circuit operationally connected to said sub-scheduler circuits to select a highest priority grant from all grants generated from said subscheduler circuits for a specific channel and to transmit said selected highest priority grant to an input channel that corresponds to said selected highest priority request.

7. The apparatus of claim 1 further including a data path multiplexer operationally connected between said plurality of input channels and said plurality of output channels, said data path multiplexer having data paths for transmitting cells to requested output channels when a request specific to an awaiting cell has been issued a grant by said scheduler circuit.

8. A method for scheduling transmissions of switching cells across an input-buffered network switch that connects a plurality of input channels to a plurality of output channels, each switching cell being associated with one of said plurality of input channels, said method including the steps of:

storing a first plurality of requests in a first request buffer that buffers requests related to a first input channel, each said request corresponding to one of said switching cells and having a priority;

storing a second plurality of requests in a second request buffer that buffers requests related to a second input channel, each said request corresponding to one of said switching cells and having a priority;

accessing said first and second pluralities of requests;

arbitrating among said requests of said accessed first and second pluralities of requests based upon availability of said first and second input channels and availability of requested output channels;

issuing a grant in response to that request of said first and second pluralities of requests that has a highest priority and for which respective input channels and output channels are available; and issuing grants in response to those requests of said first and second pluralities of requests that have lower priorities than said highest priority and that utilize input channels and output channels that are not utilized by said request having said highest priority.

9. The method of claim 8 further including a step of receiving done signals that indicate when input channels and output channels are available for new cell transmissions.

10. The method of claim 8 wherein said step of accessing includes a step of accessing each request of said first and second pluralities of requests in parallel such that all requests are accessed simultaneously.

11. The method of claim 8 wherein said step of arbitrating includes a step of arbitrating requests one at a time in descending priority from highest priority to lowest priority.

12. The method of claim 8 wherein said step of arbitrating includes a sub-step of arbitrating requests of all priority levels stored in a request buffer associated with a particular input channel in parallel.

13. The method of claim 12 wherein said step of arbitrating requests of all priority levels in parallel includes a step of executing said arbitrations in a fixed sequence with respect to said input channels.

14. The method of claim 12 wherein said step of arbitrating requests of all priority levels includes sub-steps of:

generating masks that represent all requests of similar priority levels; and comparing a mask for a particular priority level to a request having a same priority level to determine availability of output channels required by said request.

15. The method of claim 12 further including the steps of:

identifying an input channel having a highest round-robin priority among said plurality of input channels for arbitration purposes; and reserving requested output channels for a multicast request when said multicast request is associated with an input channel that has said highest round-robin priority among said plurality of input channels.

16. An apparatus for scheduling cells in an input-buffered multipoint switch having input channels and output channels comprising:

request buffers, each request buffer being specific to one of said input channels, each said request buffer having a number of register levels for storing requests of corresponding priority levels;

a means connected to said request buffers for reviewing each request stored in each request buffer and for issuing request grants to highest priority requests having available input channels and available output channels; and parallel data links between each register level of said request buffers and said means for reviewing to enable said means for reviewing simultaneous access to all of said requests stored in all of said request buffers.

17. The apparatus of claim 16 comprising a means for generating a mask vector that represents an aggregate of requested output channels for a particular priority level, said means for generating a mask vector being operatively connected to said request buffers in order to generate a distinct mask vector for each priority level.

18. The apparatus of claim 17 comprising a means for performing parallel mask comparisons between mask vectors and requests from respective priority levels for a particular input channel to indicate output channel conflicts between requests, said means for performing parallel mask comparisons being operatively connected to said means for generating a mask vector in order to receive said mask vectors.

19. The apparatus of claim 18 comprising a means for performing level-specific scheduling between said requests from respective priority levels, available input and output channels, said mask comparisons and a round-robin channel priority, said means for performing level-specific scheduling having three outputs per priority level, a level-specific request grant, an updated input channel vector, and an updated output channel vector.

20. The apparatus of claim 19 wherein said means for reviewing further comprises a means for selecting which level-specific request grant has a highest priority among all level-specific request grants for a single input channel and for transmitting said selected request grant from said means for reviewing.

* * * * *